United States Patent [19]

Rickson et al.

[11] Patent Number: 4,774,838

[45] Date of Patent: Oct. 4, 1988

[54] LIQUID LEVEL INDICATING APPARATUS

[75] Inventors: Colin D. Rickson, Woburn Sands; Douglas H. Dayment, Hampton; William V. Less, Harrow Weald, all of United Kingdom

[73] Assignee: Adwel Industries Limited, Middlesex, United Kingdom

[21] Appl. No.: 20,936

[22] Filed: Mar. 2, 1987

[30] Foreign Application Priority Data

Mar. 3, 1986 [GB] United Kingdom ............... 8605213

[51] Int. Cl.[4] .................. G01F 23/22; G01K 1/14
[52] U.S. Cl. ..................... 73/295; 307/310; 374/142
[58] Field of Search ............ 73/295; 340/622; 374/142, 178; 307/310

[56] References Cited

U.S. PATENT DOCUMENTS

| | | | |
|---|---|---|---|
| 3,161,050 | 10/1962 | Exner | 73/295 |
| 3,278,757 | 10/1966 | Ragen | 307/257 X |
| 3,914,950 | 10/1975 | Fletcher et al. | 62/49 |
| 3,955,416 | 5/1976 | Waiwood | 73/295 |
| 3,992,668 | 11/1976 | Finger | 340/622 X |
| 4,065,967 | 1/1978 | Beeston | 73/295 |
| 4,300,048 | 11/1981 | Barbier et al. | 374/178 X |
| 4,307,606 | 12/1981 | Johnson | 73/295 |
| 4,331,888 | 5/1982 | Yamauchi | 307/310 X |
| 4,358,955 | 11/1982 | Rait | 73/295 |
| 4,395,139 | 7/1983 | Namiki et al. | 374/178 |
| 4,424,461 | 1/1984 | Taguchi et al. | 307/310 |

FOREIGN PATENT DOCUMENTS

| | | |
|---|---|---|
| 0119072 | 9/1984 | European Pat. Off. . |
| WO82/01249 | 4/1982 | PCT Int'l Appl. . |
| 772046 | 4/1957 | United Kingdom . |
| 1033067 | 6/1966 | United Kingdom . |
| 1185132 | 3/1970 | United Kingdom . |
| 1378158 | 12/1974 | United Kingdom . |

OTHER PUBLICATIONS

"A Superconducting (Nb-Ti) Liquid Helium Level Detector", K. R. Efferson, Advance in Cryogenic Engineering, vol. 159, 10–18 Jun. 1969, pp. 124–131.

Primary Examiner—Daniel M. Yasich
Attorney, Agent, or Firm—Dann, Dorfman, Herrell and Skillman

[57] ABSTRACT

Electrical apparatus for providing an indication of the level of the contents of a container comprises a temperature sensing unit, means for mounting, e.g. detachably, the temperature sensing unit against a container wall and visual and/or audible indicator means. The temperature sensing unit comprises a temperature sensing circuit including at least two spaced apart temperature sensors and an indicator circuit for energizing the indicator means. In use, energization of the indicator means occurs when the temperature sensors detect at least a minimum temperature difference.

14 Claims, 2 Drawing Sheets

LIQUID LEVEL INDICATING APPARATUS

BACKGROUND OF THE INVENTION

This invention relates to an electrical apparatus for providing an indication of the level of a liquid contained in a container having walls with good heat conducting properties. In particular, but not exclusively, the apparatus is intended to provided a visual and/or audible indication of the level of liquid gas, e.g. liquid propane or liquid butane, in a metal walled, valved container of the kind used for camping or space heating purposes.

In EP-A-No. 119072 there is described a liquid level indicator for indicating the level of contained liquid gas n a cylinder which comprises a number of temperature-sensing strips each including at least one thermochromatic liquid crystal composition. In use the indicator is applied to the outside of the cylinder for liquid gas. As gas is withdrawn from the cylinder, liquid gas within the cylinder vaporises and a temperature difference or gradient is established in the wall of the cylinder at the level of the contained liquid gas. This temperature gradient is detected by the temperature-sensing strips, at least one of which changes colour at the level of the contained liquid gas. The vaporisation of the liquid gas within the cylinder, creating the temperature gradient in the cylinder walls at the level of the contained liquid gas, occurs naturally as gas is withdrawn from the cylinder. However a temperature gradient may also occur either under normal storage conditions in which ambient air temperature fluctuates or by dowsing the container with hot or cold water.

It is also known from U.S. Pat. No. 3,161,050, U.S. Pat. No. 4,065,967 and U.S. Pat. No. 4,307,606 to use electrical apparatus for detecting the level of material in a tank or other container. In this respect, U.S. Pat. No. 3,161,050 employs a continuously energised heater mounted on the outside of a container to establish a heated zone along the height of the container and a motorised unit movable vertically up and down the container for detecting the temperature of the container wall at spaced unequal distances from the heater.

U.S. Pat. No. 4,065,967 discloses a silo level indicating system having a plurality of sensor units positioned at vertically spaced apart fixed positions on the outside wall of the silo. The uppermost sensor unit is a reference sensor unit and is positioned so as always to be above the level of material contained in the silo. The remaining sensor units detect the temperature of the silo wall at lower levels of the silo and compare these temperatures with that detected by the reference sensor unit. The existence of a significant temperature differential between the temperatures detected by the reference sensor unit and a compared sensor unit indicates the presence of material at or above the compared sensor unit.

U.S. Pat. No. 4,307,606 discloses apparatus for indicating the location of a thermal transition zone between heated fluid and unheated fluid in a storage tank. As in U.S. Pat. No. 4,065,967, the apparatus comprises a plurality of vertically spaced apart sensor units each designed to detect the temperature of the wall of the storage tank at the level of the sensor unit. It is necessary to provide a plurality of sensor units attached in fixed positions to the storage tank to obtain an effective indication of the level of fluid contained in the storage tank.

SUMMARY OF THE INVENTION

An aim of the present invention is to provide electrical apparatus capable of determining the position of a temperature gradient on the external surface of a wall of a liquid-containing container, e.g. a cylinder for liquid gas, for providing an audible and/or visual indication of the level of the free surface of the liquid within the container. Such apparatus is intended to be capable of detecting temperature gradients having a narrow temperature range caused, for example, by vaporisation of the liquid contents of the container. The apparatus is intended to be relatively cheap to manufacture.

According to the present invention electrical apparatus for providing an indication of the level of the contents of a container comprises a temperature sensing unit including a pair of spaced apart temperature sensing means forming part of a temperature sensing circuit, an indicator circuit connected to the temperature sensing circuit and including electrically energisable visual and/or audible indicator means and means for mounting said temperature sensing unit on the container so that the temperature sensing means are positioned at different levels against an external surface of a wall of the container, the temperature sensing circuit, when the temperature sensing means are positioned against the external surface of the container wall, being designed to supply an indicating signal to the indicator circuit for energising the visual and/or audible indicator means when the two temperature sensing means detect at least a minimum temperature difference.

Apparatus according to the invention is primarily intended for sensing the level of liquid gas, e.g. liquid propane or liquid butane, contained in a metal walled, preferably ferromagnetic, cylinder. With such a cylinder, the drop in pressure within the cylinder occasioned by a controlled withdrawal of the liquid gas, e.g. when the cylinder is connected to a stove or other burner, causes vaporisation of the contained liquid gas. The latent heat required to bring about this vaporisation causes heat to be taken from the walls of the cylinder in the region of the liquid/vapour interface of the liquid gas. A detectable temperature gradient is thus quickly established on the external surface of the cylinder wall adjacent the level of the interface and extending upwardly and downwardly thereof. Although the temperature of the temperature gradient may change during use of the cylinder, it has been found that the difference between the maximum and minimum temperatures of the temperature gradient at any time remains substantially constant if the gas is withdrawn at a constant rate. However, this temperature difference is a function of the wall thickness of the cylinder and the rate of withdrawal of the liquid gas from the cylinder and thus may vary for different cylinders or containers and for different operating conditions.

The temperature sensing unit has a comparatively small height compared with the height of the container—i.e. it does not extend over the full height of the container as with prior art level indicating apparatus. Instead the temperature sensing unit is preferably designed to be easily detachably mounted at any desired level or height on a container wall.

Suitably the temperature sensing circuit comprises a bridge circuit having two (or all four) of its arms provided by the temperature sensing means. Preferably the temperature sensing means comprise diodes operating in the reverse direction, although other semiconductor temperature sensing means, e.g. thermistors or transistors, may be employed instead in the bridge circuit. Typically the temperature sensing circuit is connected to an operational amplifier, e.g. a high input impedance amplifier such as an FET operational amplifier, for producing said indicating signal when a sufficient imbalance is created in the bridge circuit. Ideally the electrical apparatus is powered from a small battery, e.g. a 9 volt PP3, and, in this case, when the bridge circuit is formed of high impedance components, such as germanium diodes operating in the reverse direction, there is relatively little drain on the battery and the apparatus can be operated for long periods of time, e.g. up to one year, without the battery running flat.

Conveniently the visual and/or audible indicator means are mounted in the temperature sensing unit. However for certain applications, e.g. a cabinet-type gas heater, the indicator means may be mounted at a position remote from the temperature sensing unit, e.g. in the cabinet of a cabinet-type gas heater. Preferably the indicator means is a miniature low power audible indicator, e.g. a piezo-electric sounder or buzzer driven from an oscillator circuit forming part of the indicator circuit. However in addition, or even alternatively, the indicator means may comprise a low power visual indicator, e.g. a light-emitting diode.

The mounting means for mounting the temperature sensing unit against a container wall may take a variety of forms. For example the mounting means may merely comprise adhesive tape. However, in the case where the apparatus is intended to be used with liquid-containing containers comprising ferromagnetic material (e.g. iron), the mounting means preferably comprises magnetic means enabling the temperature sensing unit to be easily detachably mounted at any desired location on the container wall. The magnetic means may comprise solid magnets, although a particularly preferred mounting means is provided by magnetic particles dispersed in a flexible polymer sheet typically having a thickness of from 0.5-1.0 mm, e.g. 0.7 mm. The use of flexible magnetic mounting means is particularly preferred since the mounting means can then be easily conformed to the curvature of a container wall enabling the sensing unit to be mounted on a variety of different container walls having different curvatures. It will be appreciated that the magnetic means must have a sufficient field strength to support the weight of the temperature sensing unit on a container wall. Ideally the temperature sensing means are resiliently mounted, e.g. spring loaded, on the unit, and, in this case, the magnetic means, when mounting the temperature sensing unit on a container wall, must also be required to urge the temperature sensing means into good thermal contact with the wall against the resilient mounting of the temperature sensing means.

The electrical apparatus may be provided with an on/off switch. Conveniently such a switch is arranged to be automatically actuated when the temperature sensing unit is mounted, e.g. magnetically, on a container wall, although the switch could instead be arranged to be manually actuated, e.g. when the temperature sensing unit is operatively mounted in position on a container wall.

In addition to detecting the level of liquid contained in a container, e.g. an opaque container, the apparatus may also be arranged to provide a further indication, visibly or audibly, when the temperature of the container wall on which the temperature sensing unit is mounted falls below, or rises above, a given temperature. For example the apparatus may be designed to emit a warning signal when the temperature falls below 0° C. or a temperature in which the contained liquid freezes or cannot be used (liquid butane is not usable below approximately $-5°$ C.).

For sensing the level of liquid gas in a conventional cylinder for liquid gas, e.g. a space heating gas cylinder container from 13-15 kg of liquid butane when full, it has been found that the temperature sensing means achieve good results if spaced from 15 to 35 mm apart, e.g. 25 mm apart. However, this spacing is not too critical and acceptable results can be achieved if the temperature sensing means are spaced apart a distance greater than 35 mm.

Ideally, each temperature sensing means should be thermally insulated, apart from where it is intended to contact the container wall, to prevent its temperature being unduly influenced by ambient air conditions.

BRIEF DESCRIPTION OF THE DRAWINGS

An embodiment of the invention will now be described, by way of example, with reference to the accompanying drawings, in which.

DESCRIPTION OF THE PREFERRED EMBODIMENTS

Figure 1:
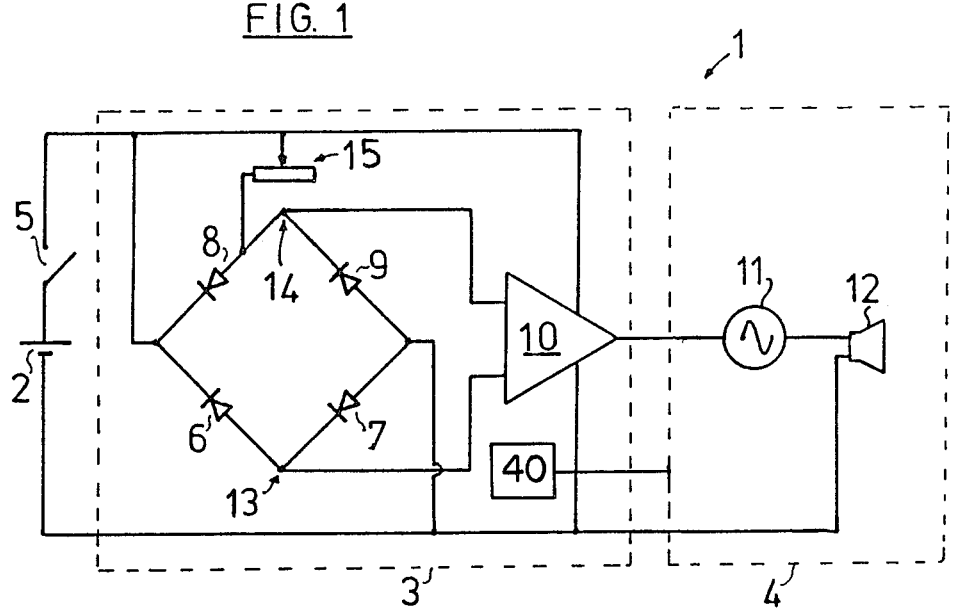
FIG. 1 is a circuit diagram for electrical apparatus according to the invention.

FIG. 1 shows an electronic circuit, generally designated 1, for a level indicating device for indicating the level of a liquid gas inside a gas cylinder (not shown). The electronic circuit 1 is powered by a suitable battery 2, e.g. a 9 volt PP3 type battery, and further comprises a temperature sensing circuit 3, an indicator circuit 4 and a push button on/off switch 5.

The temperature sensing circuit 3 comprises a high impedance diode bridge consisting of four similar type diodes 6-9, e.g. type OA 47 Ge diodes, operating in the reverse direction and a high input impedance amplifier 10, e.g. a type TL 072 FET operational amplifier. The amplifier 10 has two inputs, one of which is connected to a connection point 13 between the diodes 6 and 7 and the other of which is connected to a connection point 14 between the diodes 8 and 9. Conveniently, the two diodes 6 and 7 act as temperature sensing devices designed, in use, to be urged into thermal contact with the external wall of a gas cylinder. Alternatively, however, diodes 8 and 9 can also be used as temperature sensors, diode 8 being mounted together with diode 7 and diode 6 being mounted together with diode 9. To enable adjustment of the sensitivity of the bridge, a variable resistance 15, e.g. a trimpot, is connected as shown in FIG. 1 between the diodes 8 and 9. In particular the voltages at points 13 and 14 are adjusted, by adjusting the variable resistance 15, so that, with all the diodes at the same temperature, the voltage at point 14 is just below the voltage at point 13. Changing the variable resistance and thereby this voltage difference adjusts the sensitivity of the device. Decreasing the temperature of diode 7 relative to the diode 6 increases the voltage at point 14 relative to the voltage at point 13 so that an indicating signal from amplifier 10 is supplied to the indicator circuit 4.

The indicating circuit comprises an oscillator circuit, which in the illustrated embodiment comprises an oscillator 11 and an audio transducer 12. Any convenient oscillator 11 may be employed, e.g. one half of an operational amplifier 11 such as a type TL 072 FET operational amplifier or a unijunction oscillator. The audio transducer typically comprises a miniature piezo-electric buzzer.

In use the diodes 6–9 of the diode bridge operate in the reverse direction so as to exhibit high resistances and pass low reverse currents. In the embodiment where only the diodes 6 and 7 act as temperature sensing devices, the diodes 8 and 9 are suitably positioned adjacent each other so as to be approximately at the same temperature. The temperature sensing diodes 6 and 7 are spaced apart, for example from 15–35 mm, typically 25 mm (although a spacing apart in excess of 35 mm will produce a workable design), and are intended to be positioned one above the other against the external surface of a gas cylinder wall. If the diodes 6 and 7 are a different temperatures, different voltages, at points 13 and 14, are applied to the two inputs of the operational amplifier. Provided that a sufficient temperature differential, e.g. at least 1° C., is detected, an indicating signal is supplied to one of the inputs of the oscillator 11 and the latter energises the audio transducer 12.

Figure 2:
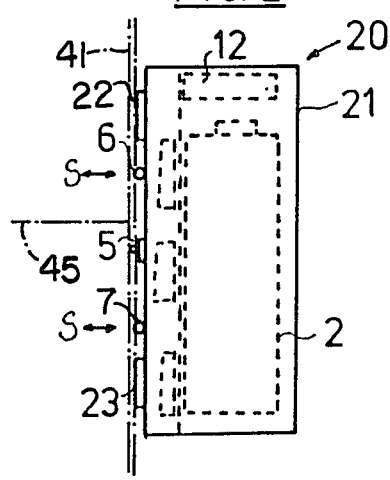
FIGS. 2 and 3 are schematic side and front views, respectively, of apparatus according to the invention.
Figure 3:
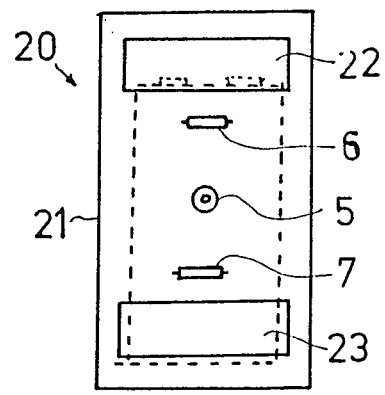

A practical embodiment of level indicating apparatus according to the invention is shown in FIGS. 2 and 3 and is designated by the reference numeral 20. The apparatus 20 comprises an openable casing 21 provided, on its front face, with spaced apart solid magnetic strips 22 and 23. The temperature sensing diodes 6 and 7 are mounted at the front of the casing 21 and conveniently can be pressed inwardly against spring biasing so as to be movable inwardly and outwardly in the directions indicated by the arrows S. Although not shown, the diodes 6 and 7 may be thermally insulated around their sides (apart from in the forward, container-contacting direction). The push button on/off switch 5 is suitably in the form of a miniature push-to-make, non-locking switch and is also mounted outside and on the front, of the casing 21. All the remaining elements of the electronic circuit 1 (i.e. the battery 2, the temperature sensing circuit 3, except for the diodes 6 and 7, and the indicator circuit 4) are mounted inside the casing 21. The casing 21 is openable and closable to enable battery replacement.

In use the level indicating apparatus 20 is conveniently positioned near the bottom of a cylinder for liquid gas made of ferromagnetic material with the diodes 6 and 7 positioned one above the other in contact with the external wall surface 41 of the cylinder (shown in broken lines in FIG. 2). The magnetic strips 22 and 23, which may be curved to conform to the cylindrical shape of the cylinder, detachably mount the apparatus against the cylinder wall and retain the diodes 6 and 7 resiliently in good thermal contact against, and the push button of the switch 5 depressed against, the cylinder wall. So long as the switch 5 remains in its "on" position, the electric circuit 1 is powered by the battery 2. As gas is withdrawn from the liquid gas cylinder by usage over a period of time, the level of contained gas drops until eventually the level is positioned between the sensors 6 and 7 as indicated by the broken line 45 in FIG. 2. The temperature gradient established at the level of the liquid gas surface in the walls of the cylinder is then detected by the apparatus and the transducer 12 is energised indicating that the cylinder is almost empty. During normal take-off or withdrawal of gas from the cylinder, the vaporisation of liquid gas within the cylinder will establish a temperature differential at the level of the liquid gas on the external wall surface of at least 1° C., and typically from between 1.5° C. to 2.0° C. Since the bridge circuit is of high impedance, drawing a small current from the battery 2, there is only a relatively low power drain from the battery. Thus the level indicating apparatus 1 can remain on the relatively long periods of time, typically for up to one year, without the battery becoming flat.

The apparatus 20 has been described as a low level indicating device for the contents of a cylinder for liquid gas. However it will be appreciated that the apparatus can be positioned for a short period of time at a number of different levels to enable the detection of the free surface level of the contained liquid gas.

Figure 4:
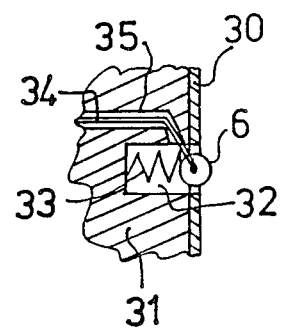
FIG. 4 is a schematic sectional view showing the spring mounting of a temperature sensor on a temperature sensing unit.

One method of spring biasing the mounting of the diodes 6, 7 is shown in FIG. 4 where a sheet 30 of plastics material having magnetic particles embedded therein is mounted on a block 31 of non-magnetic material, e.g. plastics material, forming the face of the temperature sensing unit intended to contact the container wall in use of the apparatus. The magnetic sheet 30 enables the temperature sensing unit to be detachably positioned at any desired level on the external surface of ametallic container wall. As shown, the block 31 has an opening 32 formed therein in which the diode 6 (or 7) is received. A spring 33 pushes the diode outwardly. Diode lead wires 34 can be positioned in channels 35 formed in the block 31. When the temperature sensing unit is positioned against a container wall, the diode 6 (or 7) is pressed into the opening 32 against the resilient biasing of the spring 33 until the diode is flush with the other surface of the sheet 30. The spring 33 ensures that the diode 6 (or 7) is resiliently urged into good thermal contact with the container wall. The opening 32 shrouds and thermally insulates the diode 6 (or 7) from the ambient air.

Figure 5:
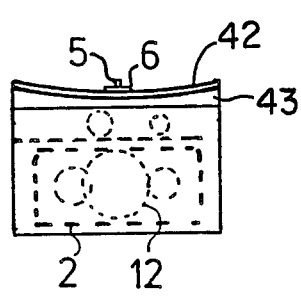
FIG. 5 is a schematic view from above of another embodiment of apparatus according to the invention.

In other embodiments of the invention the level indicating apparatus may be provided with flexible magnetic sheet material 42 (e.g. magnetic particles embedded in a flexible polymer sheet of typically 0.7mm thickness) mounted on a curved backing block 43 (see FIG. 5) in place of the magnetic strips 22 and 23 to magnetically detachably hold the temperature sensing unit against the cylinder wall at any desired level. The sheet material 42 adapts to the curved, part cylindrical shape of the block 43 and is particularly suitable for detachably mounting the temperature sensing unit on a similarly curved cylindrical container wall. If the cylinder wall is not made of ferromagnetic material, other holding means, e.g. adhesive tape (not shown), may be employed for detachably holding the apparatus against the cylinder wall.

It will be appreciated that the transducer 12 need not be mounted in the casing 21. For example in a space heater (not shown) provided with a cabinet, a buzzer could be mounted in the cabinet remote from the temperature sensing unit.

In certain applications it may be necessary to provide an electrically energisable visual indicator, e.g. a light-emitting diode, in addition to, or even in place of, the audible transducer. Furthermore a warning device, e.g., controlled by one of the diodes 6 or 7 (or all of them), can be provided to give a warning that the ambient air temperature or cylinder temperature is in excess of, or below, a predetermined temperature (e.g. near the freezing point of the contained liquid gas). For example, a further temperature-sensing means 40 operating the transducer 12 is shown schematically in FIG. 1.

As an alternative to, or in addition to, the variable resistance 15, the sensitivity of the apparatus 1 may be set, or adjusted, by introducing a small resistance into one of the arms of the bridge.

As previously mentioned, all four diodes 6–9 can be arranged to be urged into contact with a container wall. For example, diodes 6 and 9 could be mounted together to form a first temperature sensor and diodes 7 and 8 mounted together to form a second temperature sensor spaced from the first temperature sensor.

It will be appreciated that apparatus according to the invention has a single temperature sensing unit provided with at least two vertically spaced apart temperature sensing means. The temperature sensing unit is designed to be detachably mounted, at any desired height, on a container wall. The temperature sensing unit is preferably comparatively small, e.g. from 5 mm to 10 mm in height, at least in comparison with the container with which it is intended to be used—e.g. a container of liquid gas for camping or space heating purposes.

Although the invention is primarily concerned with detecting the level of liquid gas in a cylinder or container, the level indicating device may be employed for other level detecting applications involving the detection of the free surface level of other liquids in containers, typically opaque containers.

Many modifications and variations to the described invention will be apparent to those skilled in the art and it is intended that, within the scope of the ensuing claims, the invention may be practised otherwise than as specifically described herein.

We claim:

1. For use with a container having a wall with good heat-conducting properties, said wall having an exposed external surface and an internal surface in contact with the contents of the container so as to create a detectable temperature difference in the wall respectively above and below the level of the contents in the container, electrical apparatus for providing an indication of the level of the contents of the container comprising a temperature sensing unit including a temperature-sensing circuit having first and second semiconductor temperature sensing means mounted in said unit spaced apart by a given distance, an indicator circuit having connections to the temperature sensing circuit and including electrically energisable indicator means, and means for detachably mounting said temperature sensing unit on the container wall at a selected location spanning different levels so that said first and second temperature sensing means are positioned at different levels so as to be above and below said level contents, with both sensing means being in good thermal contact with the external surface of the container wall at the respective levels, the connections between the temperature sensing circuit and the indicator circuit, supplying an indicating signal to the indicator circuit for energising the indicator means when the first and second temperature sensing means detect at least a minimum temperature difference between said different levels.

2. Apparatus according to claim 1, wherein the temperature sensing circuit comprises a bridge circuit having four arms with said first and second temperature sensing means arranged in two of said arms.

3. Apparatus according to claim 1, wherein the temperature sensing circuit comprises a bridge circuit having four arms and wherein said first and second temperature sensing means each comprise a pair of temperature sensors, a different one of said temperature sensors being arranged in each of said arms.

4. Apparatus according to claim 1, wherein each of said first and second temperature sensing means comprises at least one diode.

5. Apparatus according to claim 1, wherein the temperature sensing circuit is connected to an operational amplifier for producing said indicating signal when a sufficient imbalance is created in the bridge circuit.

6. Apparatus according to claim 1, wherein the indicator means are mounted in the temperature sensing unit.

7. Apparatus according to claim 1 for use with a container having a wall of ferromagnetic material, wherein the mounting means comprises magnetic means enabling the temperature sensing unit to be easily detachably mounted at desired locations on said container wall.

8. Apparatus according to claim 7, wherein said magnetic means comprises magnetic particles dispersed in a polymer layer.

9. Apparatus according to claim 1, comprising means for resiliently mounting each of said first and second temperature sensing means on the temperature sensing unit, whereby each temperature sensing means is resiliently urged against a container wall when the temperature sensing unit is mounted on a container.

10. Apparatus according to claim 1, including an on/off switch having a depressable actuator arranged to be be retained in a depressed condition, to turn the switch on, when the temperature sensing unit is mounted on a container wall and to return to its undepressed condition, to turn the switch off, when the temperature sensing unit is removed from the container.

11. Apparatus according to claim 1, including further temperature sensing means for providing an indication when ambient air temperature or the container wall temperature is to one side of a given temperature.

12. Apparatus according to claim 1, wherein the first and second temperature sensing means are spaced apart from 15 mm to 35 mm.

13. Apparatus according to claim 1, wherein each of said first and second temperature sensing means is surrounded, apart from where it is intended to contact the container wall, by thermally insulating means to prevent its temperature being unduly influenced by ambient air temperature.

14. Electrical apparatus according to claim 1 wherein said unit comprises a casing on which said first and second sensing means are mounted spaced apart by said given distance, said means for detachably mounting said unit on the container wall being external of said casing.

* * * * *

UNITED STATES PATENT AND TRADEMARK OFFICE
CERTIFICATE OF CORRECTION

PATENT NO. : 4,774,838
DATED : October 4, 1988
INVENTOR(S) : Colin D. Rickson; Douglas H. Dayment; William V. Less It is certified that error appears in the above-identified patent and that said Letters Patent is hereby corrected as shown below:

Column 1, line 10, "provided" should be --provide--;

Column 1, line 16, "n" should be --in--;

Column 2, line 68, "semiconductor" should be --electrical--;

Column 3, line 1, after "sensing" insert --transducer--;

Column 4, line 8, "container" should be --containing--;

Column 5, line 23, "a" should be --at--;

Column 6, line 11, "the" should be --for--;

Column 7, line 48, "semiconductor" should be --electrical--;

Column 7, line 49, after "sensing" insert --transducer--.

Signed and Sealed this

Fourteenth Day of February, 1989

Attest:

DONALD J. QUIGG

*Attesting Officer*　　　*Commissioner of Patents and Trademarks*